(12) United States Patent
Teo et al.

(10) Patent No.: US 12,380,922 B2
(45) Date of Patent: Aug. 5, 2025

(54) SUSPENSION LOAD BEAM RAIL-BASED GIMBAL LIMITER

(71) Applicant: Western Digital Technologies, Inc., San Jose, CA (US)

(72) Inventors: Kia Moh Teo, San Jose, CA (US); Hiroyasu Tsuchida, Fujisawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/378,400

(22) Filed: Oct. 10, 2023

(65) Prior Publication Data

US 2025/0118330 A1 Apr. 10, 2025

(51) Int. Cl.
*G11B 5/48* (2006.01)

(52) U.S. Cl.
CPC .......... *G11B 5/4833* (2013.01); *G11B 5/4826* (2013.01)

(58) Field of Classification Search
None
See application file for complete search history.

(56) References Cited

U.S. PATENT DOCUMENTS

| | | |
|---|---|---|
| 6,377,424 B1 | 4/2002 | Yaeger |
| 6,424,498 B1 | 7/2002 | Patterson et al. |
| 6,538,850 B1 | 3/2003 | Hadian et al. |
| 6,791,798 B1 | 9/2004 | Mei |
| 6,995,953 B2 | 2/2006 | Mahoney et al. |
| 8,837,090 B2 | 9/2014 | Greminger et al. |
| 8,976,491 B1 | 3/2015 | Chen et al. |
| 9,153,275 B1 | 10/2015 | Naniwa et al. |
| 9,646,638 B1 | 5/2017 | Bjorstrom et al. |
| 11,056,137 B1 | 7/2021 | Teo |
| 11,282,539 B2 | 3/2022 | Kudo |
| 2007/0247760 A1* | 10/2007 | Hanya et al. ........ G11B 5/4833 360/245.5 |
| 2009/0009911 A1 | 1/2009 | Yang et al. |
| 2009/0154022 A1* | 6/2009 | Takikawa ............. G11B 5/4833 360/245.7 |
| 2013/0148231 A1 | 6/2013 | Huang et al. |
| 2015/0016235 A1 | 1/2015 | Bennin et al. |

FOREIGN PATENT DOCUMENTS

EP 1055229 A1 11/2000

OTHER PUBLICATIONS

Liu, Yan et al., Investigation of HDD Ramp Unloading Processes with an Efficient Scheme, Advances in Applied Mathematics and Mechanics, Dec. 2011, Received Dec. 30, 2009; Accepted (in revised version) May 17, 2011, Available online Oct. 31, 2011, Adv. Appl. Math. Mech., vol. 3, No. 6, pp. 716-728, Global Science Press.

* cited by examiner

*Primary Examiner* — Craig A. Renner
(74) *Attorney, Agent, or Firm* — John D. Henkhaus

(57) ABSTRACT

A head gimbal assembly (HGA), such as for a hard disk drive (HDD), includes a load beam formed with a deck and side rails extending away from each lateral edge of the deck in a direction away from a corresponding flexure, where each side rail portion includes a limiter structure extending from the side rail in a direction toward the flexure, the limiter structure including a hooking portion positioned on a distal side of the flexure for limiting displacement of the flexure in a direction away from the load beam. As an integral part of the load beam, the limiters do not adversely impact the existing gimbal dynamic performance designed to enable high areal density HDDs.

10 Claims, 8 Drawing Sheets

SUSPENSION LOAD BEAM RAIL-BASED GIMBAL LIMITER

FIELD OF EMBODIMENTS

Embodiments of the invention may relate generally to a hard disk drive and particularly to a gimbal limiter for a load beam side rail of a suspension assembly.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head (or "transducer") that is positioned over a specific location of a disk by an actuator. A read-write head makes use of magnetic fields to write data to and read data from the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic disk, which in turn magnetizes a small area on the recording medium.

An HDD includes at least one head gimbal assembly (HGA) that generally includes a slider that houses the read-write transducer (or "head"), and a suspension. Each slider is attached to the free end of a suspension that in turn is cantilevered from the rigid arm of an actuator. Several actuator arms may be combined to form a single movable unit, a head stack assembly (HSA), typically having a rotary pivotal bearing system. The suspension of a conventional HDD typically includes a relatively stiff load beam with a mount plate at its base end, which attaches to the actuator arm, and whose free end mounts a flexure (or "gimbal" or "gimbal flexure") that carries the slider and its read-write head. Positioned between the mount plate and the functional end of the load beam is effectively a "hinge" that is compliant in the vertical bending direction (normal to the disk surface). The hinge enables the load beam to suspend and load the slider and the read-write head toward the spinning disk surface. It is then the function of the flexure to provide gimbaled support for the slider so that the slider can pitch and roll in order to adjust its orientation. However, customer specifications and/or common design and operational constraints include operational shock (or "op-shock") and non-operational shock (or "non-op shock") requirements, which generally relate to an HDD's resistance to or tolerance of a mechanical shock event while operating and not while operating, respectively.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Figure 1:
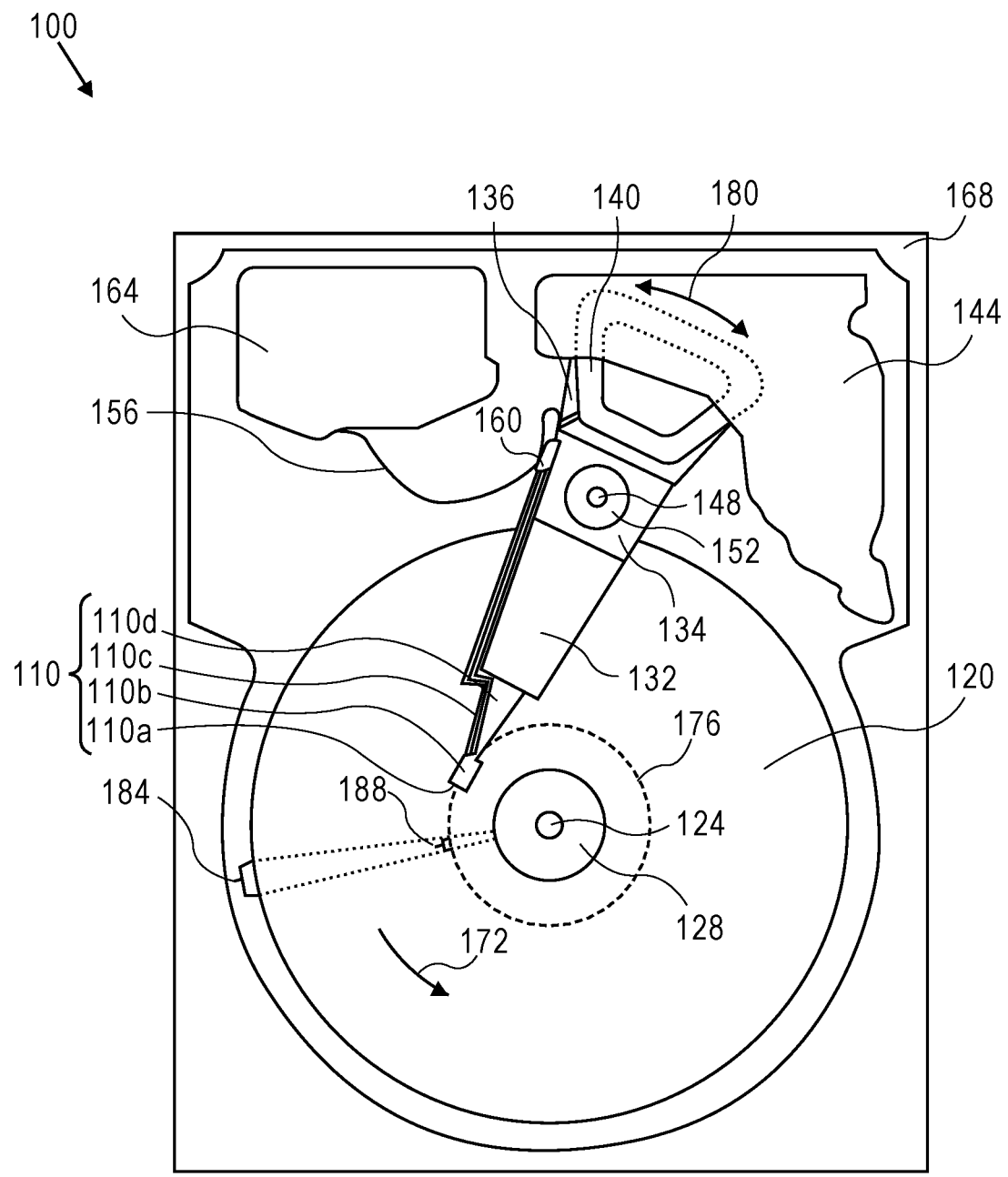
FIG. 1 is a plan view illustrating a hard disk drive, according to an embodiment.

Generally, approaches to a suspension load beam rail-based gimbal limiter for a hard disk drive (HDD), are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices may be shown in block diagram form in order to avoid unnecessarily obscuring the embodiments of the invention described herein.

INTRODUCTION

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment or to every embodiment.

The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Context

Increasing the storage capacity of hard disk drives (HDDs) is one of the on-going goals of HDD technology evolution. In one form, this goal manifests in increasing the number of disks incorporated therein. However, oftentimes the customer demand requires maintaining a standard form factor, as characterized in part by the z-height of an HDD. This inherently provides challenges with respect to fitting more disks into a given device. Recall that the suspension typically includes a relatively stiff load beam whose free end mounts a gimbal flexure that carries the slider and its read-write head. Thus, it remains a goal to increase the number of disks while maintaining a standard form factor, which decreases the distance between each disk of the disk stack, while also reliably meeting op-shock and non-op shock requirements. For example, a non-operational shock requirement is typically hundreds of times the force of gravity (g), while the flexure is intentionally movably/gimbally coupled with the load beam. Thus, limiting the displacement of the flexure and slider in response to a shock event, while maintaining superior gimbal dynamic performance, presents an important challenge.

Figure 2:
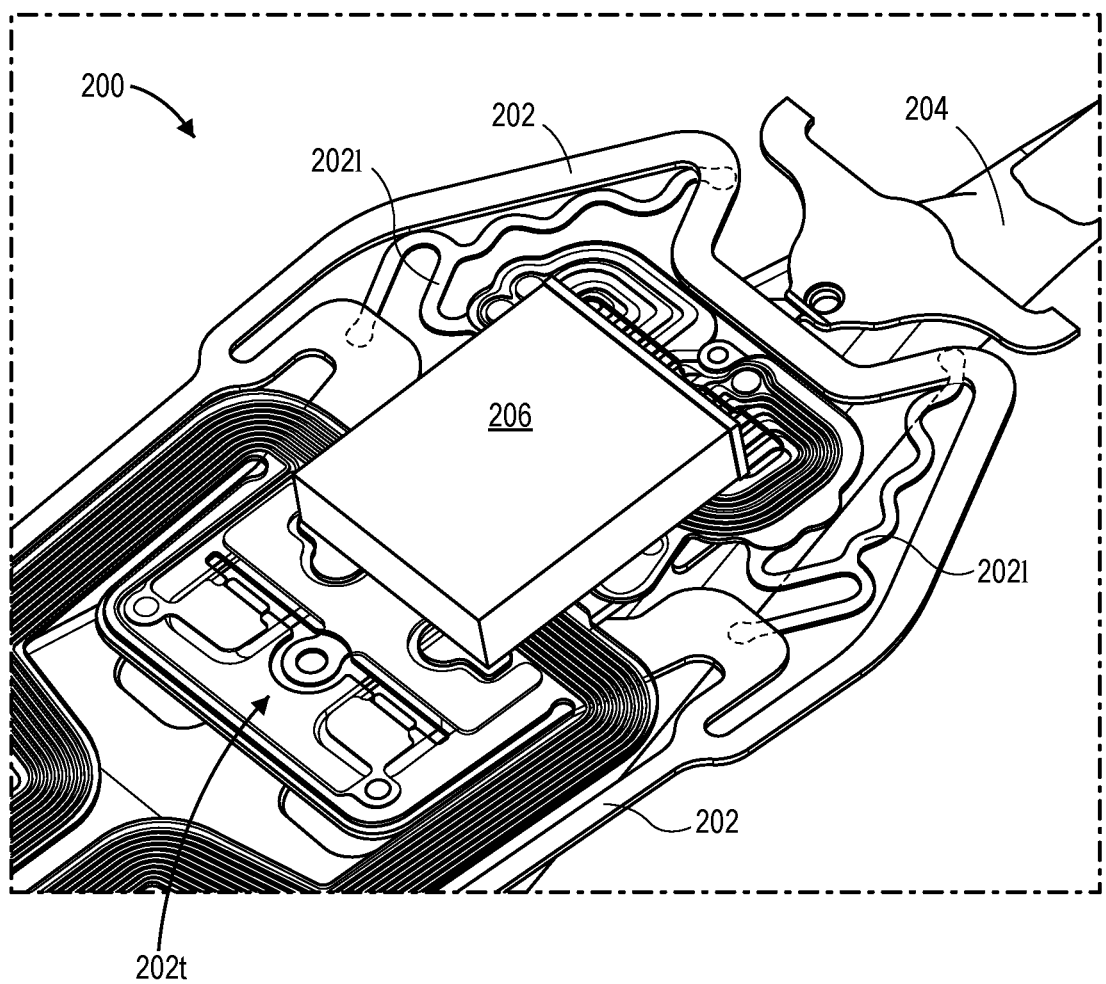
FIG. 2 is a perspective view illustrating a head gimbal assembly having a limiter outrigger structure.

FIG. 2 is a perspective view illustrating a head gimbal assembly having a limiter outrigger structure. Head gimbal assembly (HGA) 200 includes a flexure 202 movably coupled with a load beam 204. The HGA 200, particularly the flexure 202, includes a tongue 202*t* area on which a slider 206 is mounted, as well as possibly a set of piezoelectric (PZT) microactuators (not visible) and associated features. Thus, there is little to no room for traditional gimbal limiters in this area, such as a T-bar, Z, or merged limiters, and traditional limiters are not entirely feasible without a consequent degradation of current gimbal dynamic performance. One approach then involves the use of a limiter outrigger structure, i.e., limiter 2021, with the flexure 202 (e.g., stainless steel) for stiffening purposes. As such limiter 2021 acts as a displacement/slider trailing end pitching stiffener and contributes to limiting the displacement/pitching of the tongue 202*t* when it may stretch during a shock event. However, even with the use of a limiter structure such as a polyimide limiter 2021, a significantly undesirable displacement of the slider 206 may still be observed, due at least in part to polyimide flexibility and consequent plastic deformation under non-op shock. Without a limiter 2021, slider 206 displacement and flexure 202 deformation would be even higher.

Load Beam Side Rail-Based Gimbal Limiter

Figure 3A:
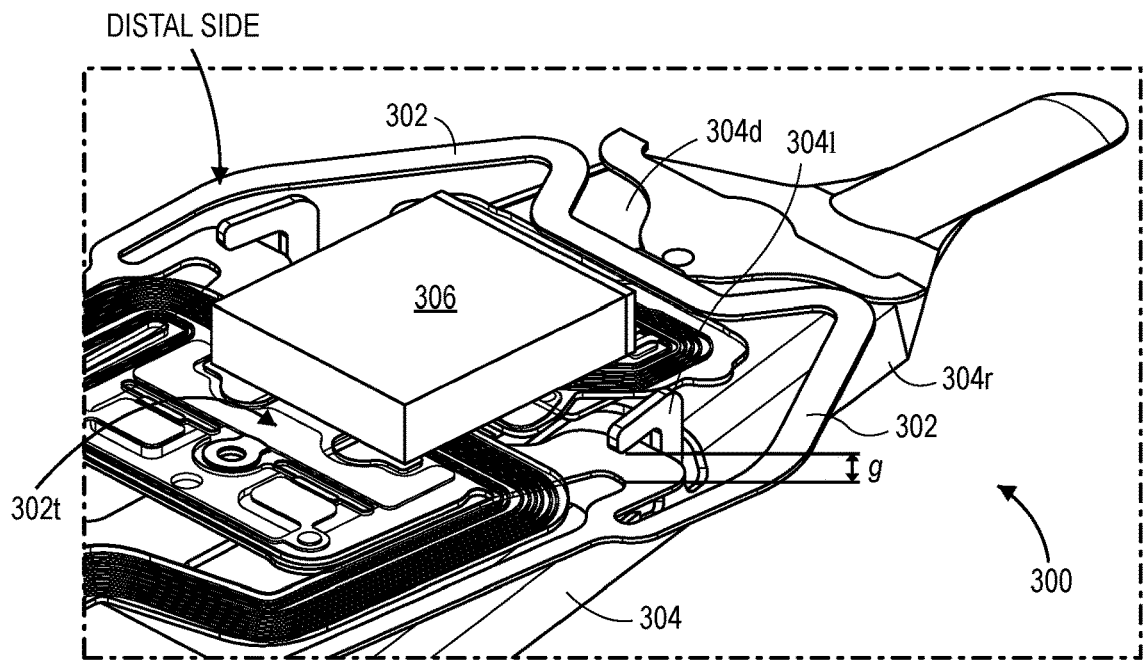
FIG. 3A is a perspective view illustrating a head gimbal assembly having a suspension load beam rail-based limiter structure, according to an embodiment.
Figure 3B:
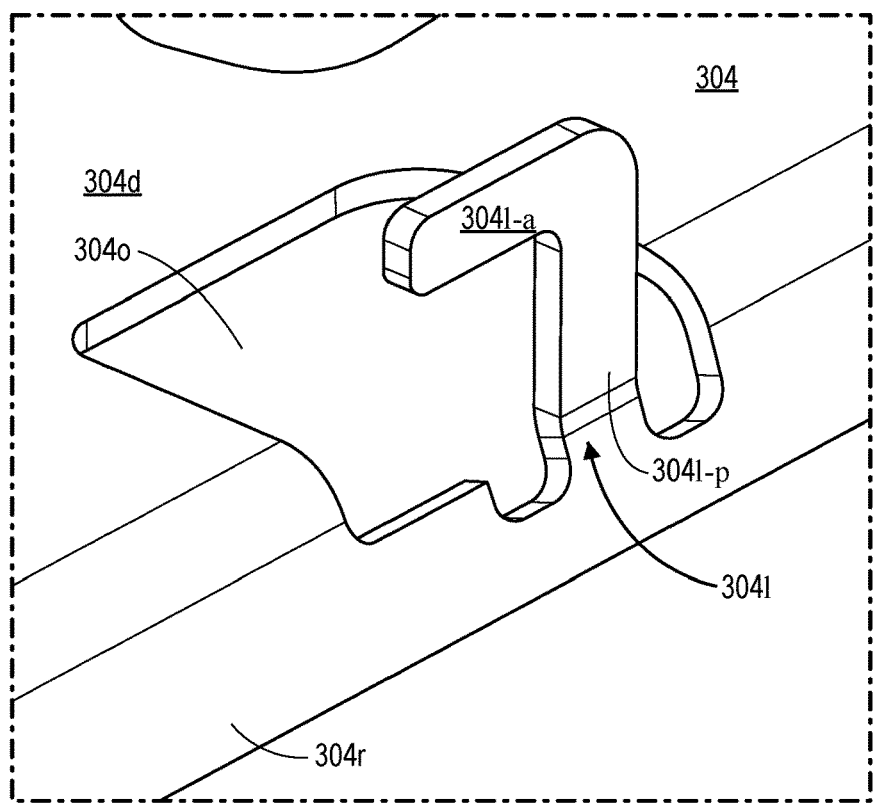
FIG. 3B is a perspective view illustrating the suspension load beam rail-based limiter structure of FIG. 3A, according to an embodiment.
Figure 3C:
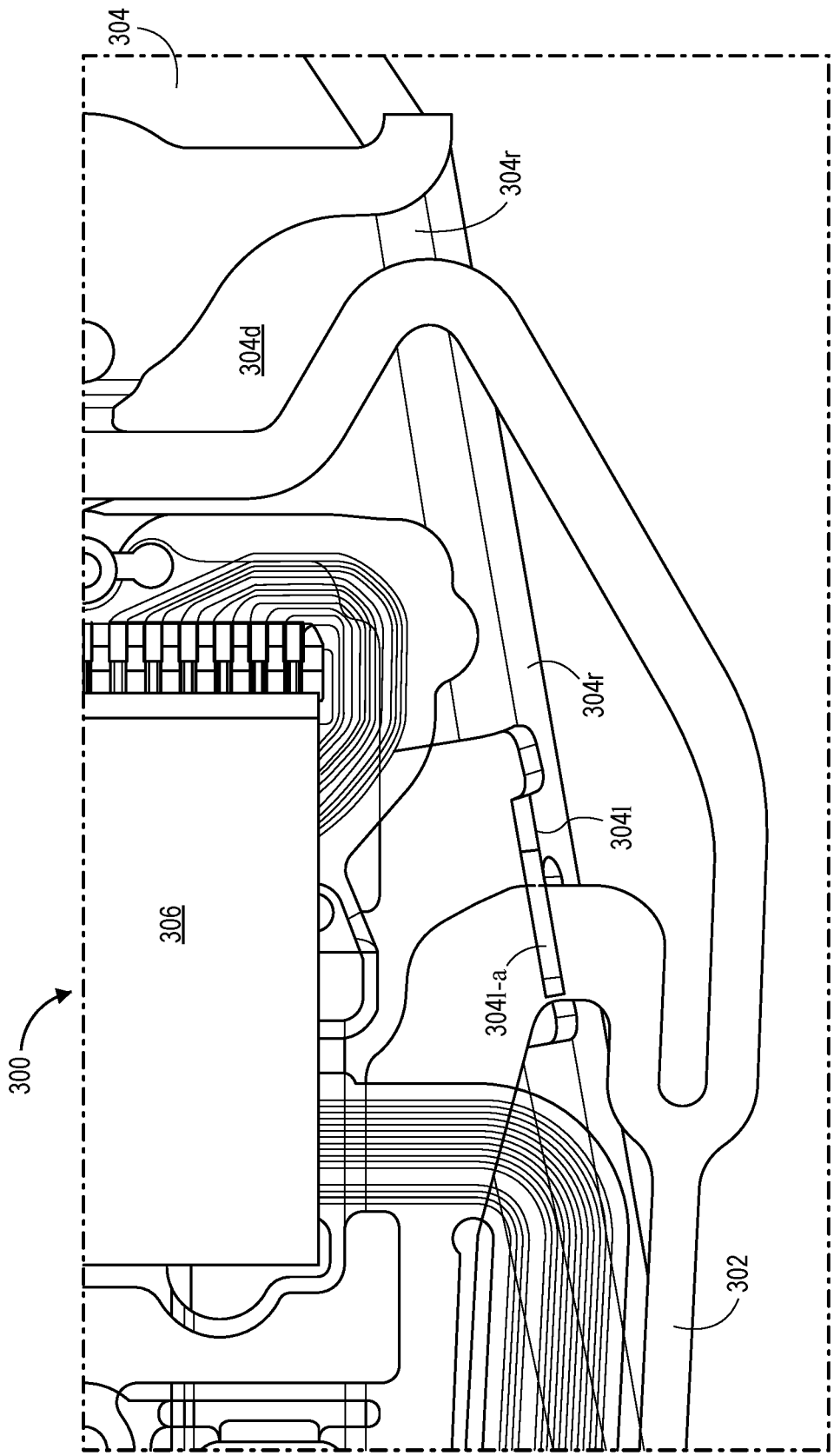
FIG. 3C is a top view illustrating the suspension load beam rail-based limiter structure of FIG. 3A, according to an embodiment.

FIG. 3A is a perspective view illustrating a head gimbal assembly having a suspension load beam rail-based limiter structure, FIG. 3B is a perspective view illustrating the suspension load beam rail-based limiter structure of FIG. 3A, and FIG. 3C is a top view illustrating the suspension load beam rail-based limiter structure of FIG. 3A, all according to an embodiment.

Hard disk drive head gimbal assembly (HGA) 300 includes a flexure 302 movably coupled with a load beam 304, where the load beam 304 and flexure 302 may be collectively referred to as a suspension. The HGA 300, particularly the flexure 302, includes a tongue 302*t* area on which a slider 306 is mounted, as well as possibly a set of piezoelectric (PZT) microactuators (not visible) and associated features. Load beam 304 comprises a substantially planar deck portion 304*d* (or simply "deck") and a side rail portion 304*r* (or simply "side rail") extending away from each edge of the deck portion 304*d* in a direction away from the flexure 302. According to an embodiment, each side rail portion 304*r* of the load beam 304 comprises a limiter structure 304*l* (or simply "limiter 304*l*") extending from the side rail portion 304*r* in a direction toward the flexure 302 and having a hooking portion 304*l-a* (or "arm extension 304*l-a*") positioned on a distal side of the flexure 302 for limiting displacement of the flexure 302 in a direction away from the load beam 304. According to an embodiment, HGA 300 has a particular (e.g., predetermined) limiter gap (g) between the hooking portion 304*l-a* of the limiter 304*l* of the load beam 304 and the flexure 302. Thus, the limiter gap g in practice defines the maximum displacement that the flexure 302 is mechanically permitted in the direction away from the load beam 304, as the limiter 304*l* hooks around a portion of the flexure 302 and thereby physically, structurally limits the relative movement between the flexure 302 (e.g., plastic deformation thereof) and the load beam 304 in this area.

Notably, the hooking portion 304*l-a* is positioned relative to the flexure 302 at a location outside of the flexure tongue 302*t*, i.e., a mechanically and functionally dense area at which the head slider 306 (and microactuators (not visible) and associated features, if any) is mounted. Furthermore, this arrangement places the hooking portion 304*l-a* relative to the flexure 302 at a gimballing portion of the flexure 302. While not visible here, load beam 304 further comprises a gimbal dimple (see, e.g., gimbal dimple 404*g*, 504*g* of FIGS. 4B, 4D, 5A), whereby flexure 302 is movably coupled (i.e., gimballed) to the load beam 304 via the dimple and has freedom of rotation about the corresponding dimple axis. Thus, limiter 304*l* limits the displacement between the flexure 302 and the load beam 304 in the z-direction (e.g., generally considered the vertical direction) while maintaining the necessary gimballing functionality of the flexure 302 and corresponding slider 306 relative to load beam 304, for operational purposes. Furthermore, the hooking portion 304*l-a* of each limiter 304*l* is positioned substantially coincident/colinear with the center of mass of the slider, e.g., coincident/colinear with the dimple on which the flexure 302-slider 306 gimbals, thereby providing for optimal effectiveness of such a limiter 304*l*. Still further, as an integral part of the load beam 304, limiter 304*l* does not adversely impact the existing gimbal dynamic performance designed to enable high areal density (a measure of the quantity of information bits that can be stored on a given area of disk surface) HDDs.

According to an embodiment, each limiter structure 304*l* comprises a proximal portion 304*l-p* extending directly from the corresponding side rail portion 304*r* of the load beam 304, and the hooking portion 304*l-a* extending from the proximal portion 304*l-p*. According to an embodiment and with reference to FIGS. 3A-3C, a majority of the proximal portion 304*l-p* extends substantially normal to the deck portion 304*d* of the load beam 304, and the hooking portion 304*l-a* extends substantially parallel to the deck portion 304*d*.

Note that the precise shape of the limiter structure 304*l* of load beam 304 may vary from implementation to implementation based, for example, on mechanical configurations and constraints, various design goals, and the like. In furtherance of ease of manufacturing, a different shape of limiter structure may be implemented. For example, a limiter structure configured and/or bent in such a way so as to raise and/or bend away the terminal tip of the hooking portion of the limiting structure (see, e.g., limiter structure 404*l* of FIGS. 4A-4D, limiter structure 504*l* of FIGS. 5A-5B) can enable simpler manufacturing assembly of the flexure with the load beam, e.g., to make is easier to insert or slip the flexure under the hooking portion of the limiter structure of the load beam side rail.

Figure 4A:
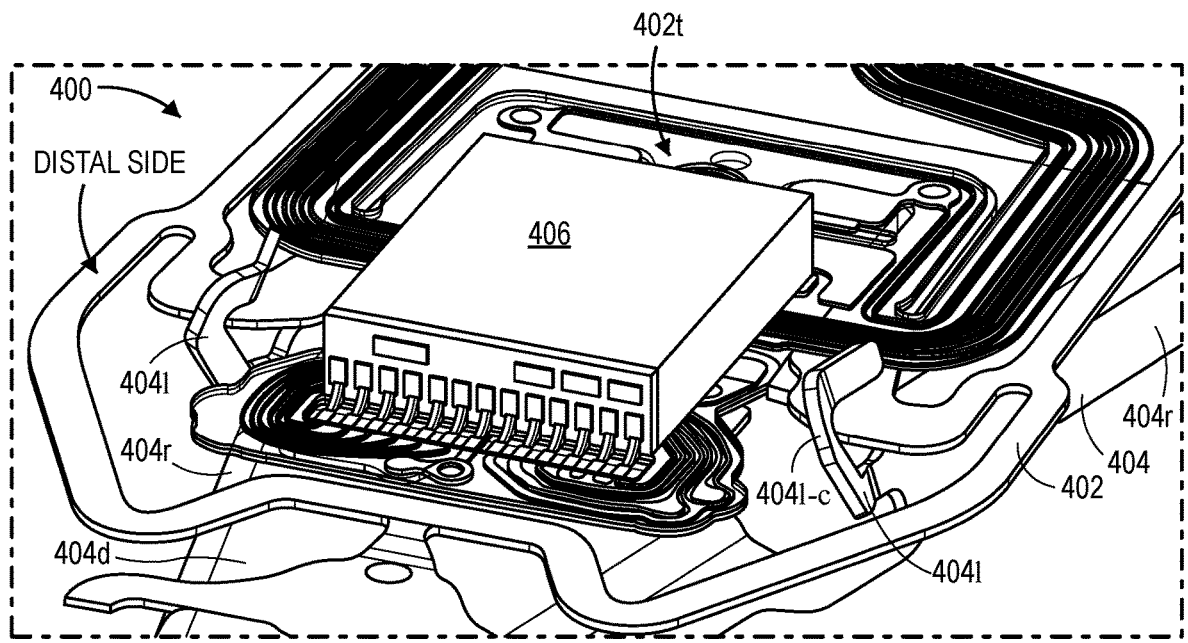
FIG. 4A is a perspective view illustrating a head gimbal assembly having a suspension load beam rail-based limiter structure, according to an embodiment.
Figure 4B:
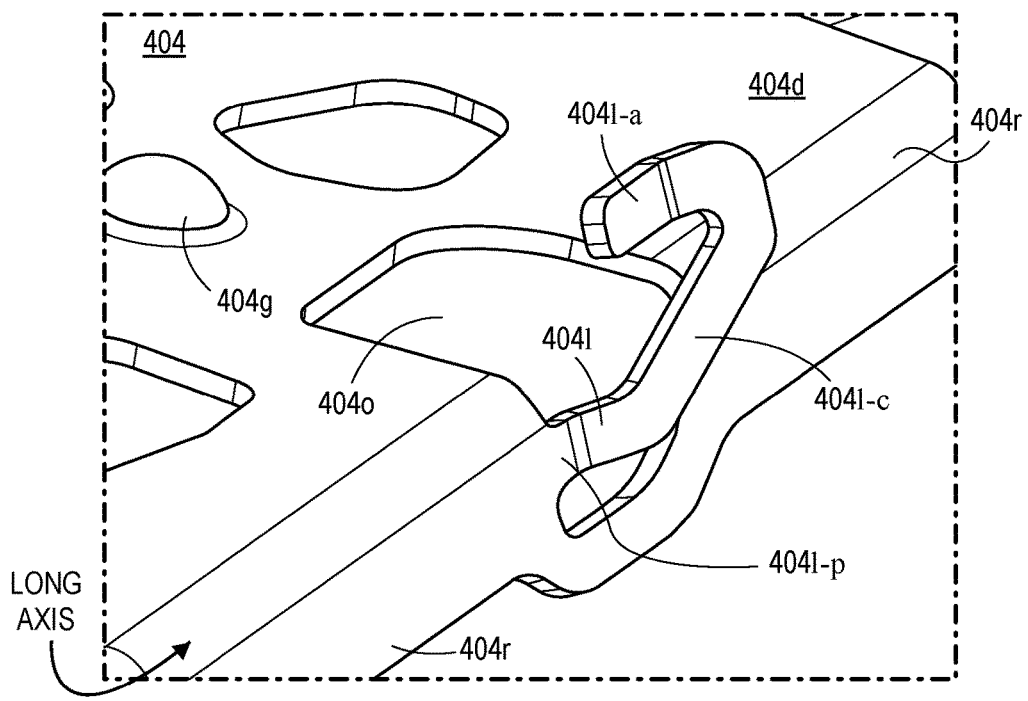
FIG. 4B is a perspective view illustrating the suspension load beam rail-based limiter structure of FIG. 4A, according to an embodiment.
Figure 4C:
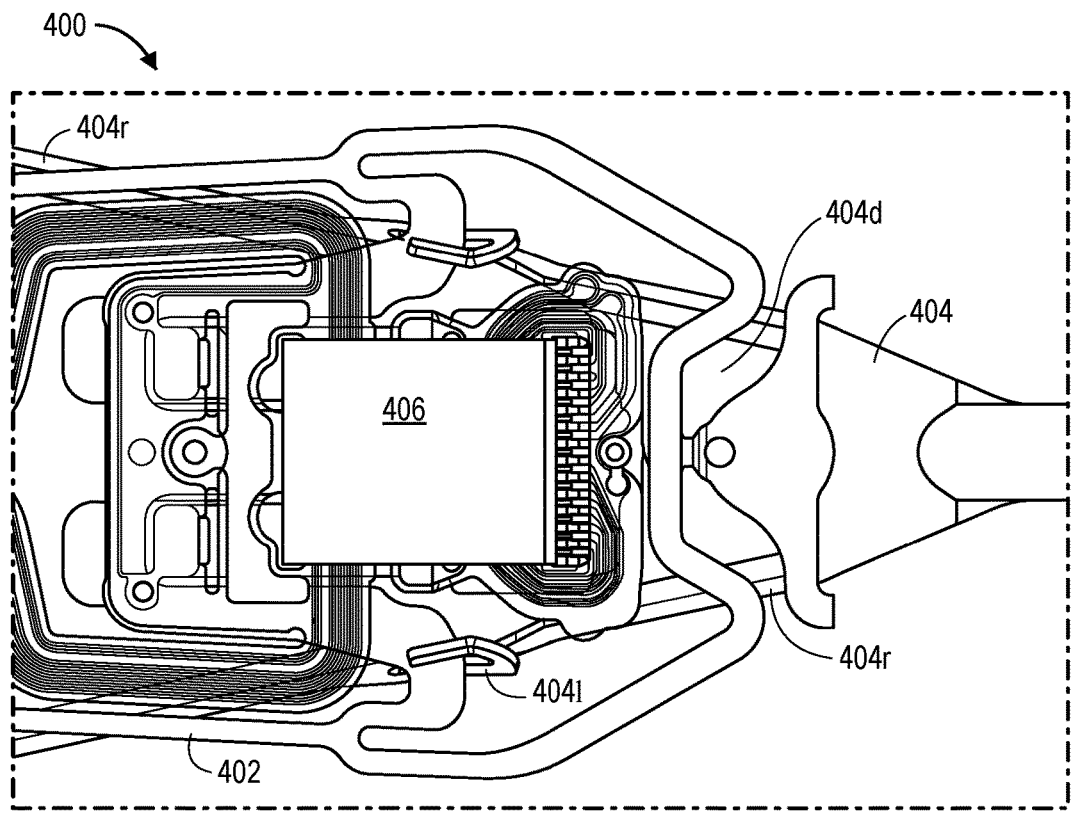
FIG. 4C is a top view illustrating the suspension load beam rail-based limiter structure of FIG. 4A, according to an embodiment.
Figure 4D:
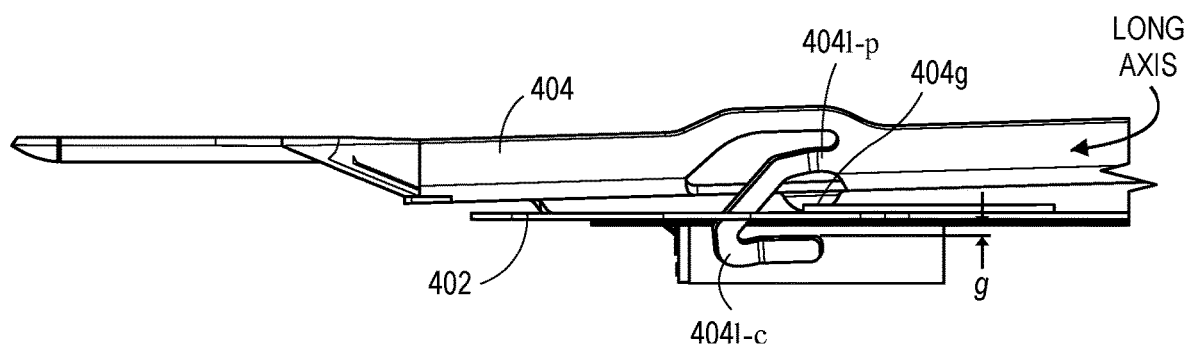
FIG. 4D is a side view illustrating the suspension load beam rail-based limiter structure of FIG. 4A, according to an embodiment.

FIG. 4A is a perspective view illustrating a head gimbal assembly having a suspension load beam rail-based limiter structure, FIG. 4B is a perspective view illustrating the suspension load beam rail-based limiter structure of FIG. 4A, FIG. 4C is a top view illustrating the suspension load beam rail-based limiter structure of FIG. 4A, and FIG. 4D is a side view illustrating the suspension load beam rail-based limiter structure of FIG. 4A, all according to an embodiment.

Hard disk drive head gimbal assembly (HGA) 400 includes a flexure 402 movably coupled with a load beam 404, where the load beam 404 and flexure 402 may be collectively referred to as a suspension. The HGA 400, particularly the flexure 402, includes a tongue 402*t* area on which a slider 406 is mounted, as well as possibly a set of piezoelectric (PZT) microactuators (not visible) and associated features. Load beam 404 comprises a substantially planar deck portion 404*d* (or simply "deck") and a side rail portion 404*r* (or simply "side rail") extending away from each edge of the deck portion 404*d* in a direction away from the flexure 402. According to an embodiment, each side rail portion 404*r* of the load beam 404 comprises a limiter structure 404*l* (or simply "limiter 404*l*") extending from the side rail portion 404*r* in a direction toward the flexure 402 and having a hooking portion 404*l-a* (or "arm extension 404*l-a*") positioned on a distal side of the flexure 402 for limiting displacement of the flexure 402 in a direction away from the load beam 404. According to an embodiment, HGA 400 has a particular (e.g., predetermined) limiter gap (g) between the hooking portion 404*l-a* of the limiter 404*l* of the load beam 404 and the flexure 402 (see, e.g., FIG. 4D). Thus, the limiter gap g in practice defines the maximum displacement that the flexure 402 is mechanically permitted in the direction away from the load beam 404, as the limiter 404*l* hooks around a portion of the flexure 402 and thereby physically, structurally limits the relative movement between the flexure 402 (e.g., plastic deformation thereof) and the load beam 404 in this area.

Notably, here too the hooking portion 404*l-a* is positioned relative to the flexure 402 at a location outside of the flexure tongue 402*t*, i.e., a mechanically and functionally dense area at which the head slider 406 (and microactuators (not visible) and associated features, if any) is mounted. Furthermore, this arrangement places the hooking portion 404*l-a* relative to the flexure 402 at a gimballing portion of the flexure 402. Load beam 404 further comprises a gimbal dimple 404*g*, whereby flexure 402 is movably coupled (i.e., gimballed) to the load beam 404 via the dimple 404*g* and has freedom of rotation about the corresponding dimple axis. Thus, limiter 404*l* limits the displacement between the flexure 402 and the load beam 404 in the z-direction while maintaining the necessary gimballing functionality of the flexure 402 and corresponding slider 406 relative to load beam 404, for operational purposes. Furthermore, the hooking portion 404*l-a* of each limiter 404*l* is positioned substantially coincident/colinear with the center of mass of the slider, e.g., coincident/colinear with the dimple 404*g* on which the flexure 402-slider 406 gimbals, thereby providing for optimal effectiveness of such a limiter 404*l*. Still further, as an integral part of the load beam 404, limiter 404*l* does not adversely impact the existing gimbal dynamic performance designed to enable high areal density (a measure of the quantity of information bits that can be stored on a given area of disk surface) HDDs.

According to an embodiment, each limiter structure 404*l* comprises a proximal portion 404*l-p* extending directly from the corresponding side rail portion 404*r* of the load beam 404, and the hooking portion 404*l-a* extending from the proximal portion 404*l-p*. According to an embodiment and with reference to FIGS. 4A-4D, the proximal portion 404*l-p* initially extends from the corresponding side rail portion 404*r* in a direction in a plane of the side rail portion 404*r* along a long axis of the side rail portion 404*r*, and an adjoining substantially c-shaped section 404*l-c* (e.g., the hooking portion) bends outward from the plane of the side rail portion 404*r*.

Figure 5A:
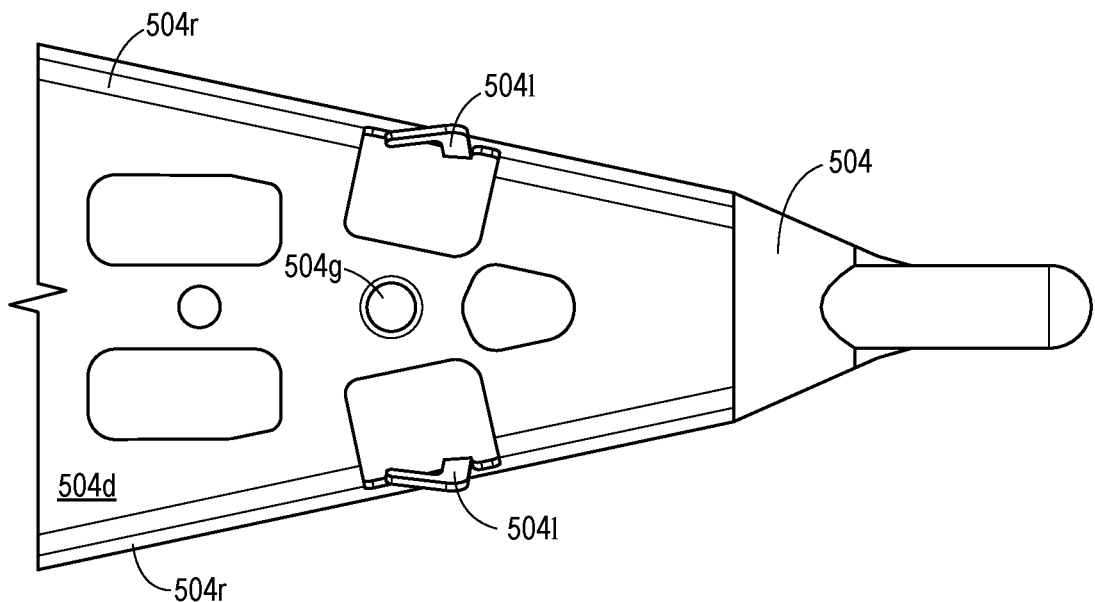
FIG. 5A is a top view illustrating a suspension load beam rail-based limiter structure, according to an embodiment.
Figure 5B:
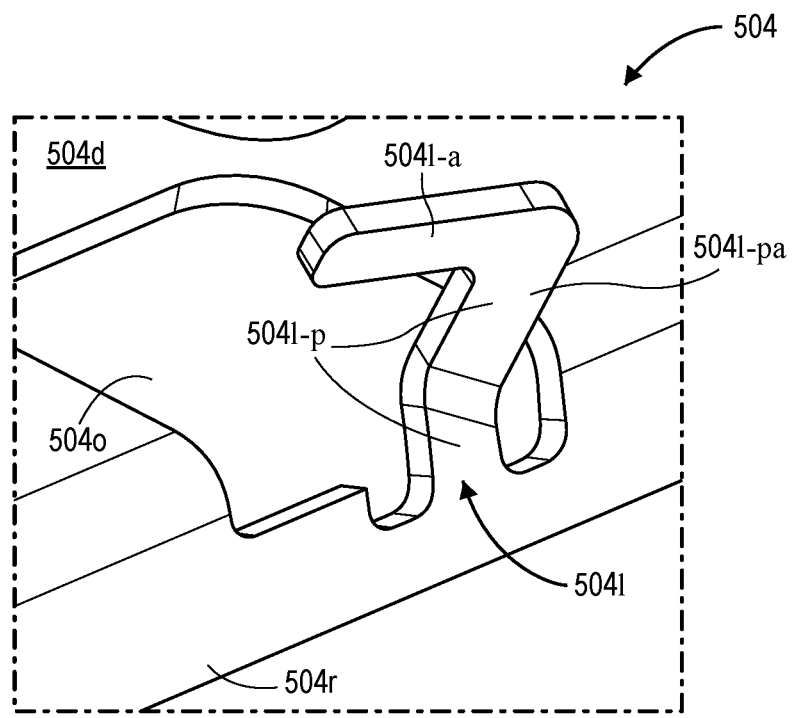
FIG. 5B is a perspective view illustrating the suspension load beam rail-based limiter structure of FIG. 5A, according to an embodiment.

FIG. 5A is a top view illustrating a suspension load beam rail-based limiter structure, and FIG. 5B is a perspective view illustrating the suspension load beam rail-based limiter structure of FIG. 5A, both according to an embodiment. Load beam 504 comprises a substantially planar deck portion 504*d* (or simply "deck") and a side rail portion 504*r* (or simply "side rail") extending away from each edge of the deck portion 504*d*, and in an assembled form in a direction away from a corresponding flexure. According to an embodiment, each side rail portion 504*r* of the load beam 504 comprises a limiter structure 504*l* (or simply "limiter 504*l*") extending from the side rail portion 504*r* in a direction opposing the direction of which each side rail portion 504*r* extends, i.e., toward the corresponding flexure, and having a hooking portion 504*l-a* (or "arm extension 504*l-a*") positioned on a distal side of the flexure for limiting displacement of the flexure in a direction away from the load beam 504 (see, e.g., similar scenarios of FIGS. 3A, 3C, 4A, 4C-4D). According to an embodiment, an HGA of which the load beam 504 is part would have a particular (e.g., predetermined) limiter gap between the hooking portion 504*l-a* of the limiter 504*l* of the load beam 504 and the corresponding flexure. Thus, the limiter gap in practice would define the maximum displacement that the flexure is mechanically permitted in the direction away from the load beam 504, as the limiter 504*l* would hook around a portion of the flexure and thereby physically, structurally limits the relative movement between the flexure and the load beam 504 in this area. Load beam 504 further comprises a gimbal dimple 504*g*, whereby a corresponding flexure would be movably coupled (i.e., gimballed) to the load beam 504 via the dimple 504*g* and therefore would have freedom of rotation about the corresponding dimple axis. Thus, limiter 504*l* would limit the displacement between a flexure and the load beam 504 in the z-direction while maintaining the necessary gimballing functionality of the flexure and a corresponding slider relative to load beam 504, for operational purposes. Furthermore, the hooking portion 504*l-a* of each limiter 504*l* is positioned substantially coincident/colinear with the center of mass of the slider, e.g., coincident/colinear with the dimple 504g on which the flexure-slider gimbals, thereby providing for optimal effectiveness of such a limiter 504l.

According to an embodiment, each limiter structure 504l comprises a proximal portion 504l-p extending directly from the corresponding side rail portion 504r of the load beam 504, and the hooking portion 504l-a extending from the proximal portion 504l-p. According to an embodiment and with reference to FIGS. 5A-5B, a majority of the proximal portion 504l-p extends at a laterally outward skew angle (deviating from a straight line) from the rail side portion 504r of the load beam 504. More particularly, and according to an embodiment, the proximal portion 504l-p initially extends from the corresponding side rail portion 504r in a plane of the side rail portion 504r in a direction toward the flexure, and an adjoining portion 504l-pa of the proximal portion 504l-p leading to the hooking portion 504l-a extends at a laterally outward angle from the plane of the rail side portion 504r.

Method of Assembling a Head Gimbal Assembly

Figure 6:
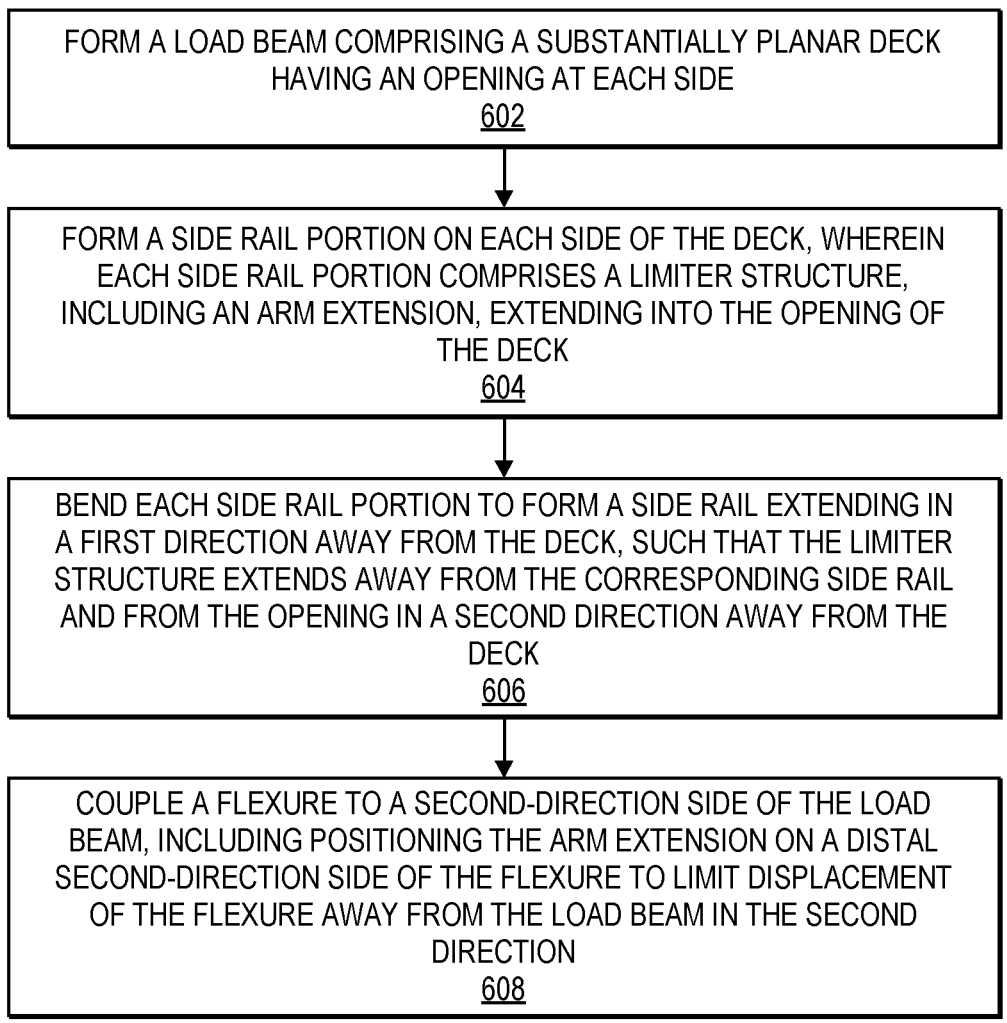
FIG. 6 is a flow diagram illustrating a method of manufacturing a head gimbal assembly, according to an embodiment.

FIG. 6 is a flow diagram illustrating a method of manufacturing a head gimbal assembly, according to an embodiment. A head gimbal assembly (HGA) assembled, manufactured, produced according to the method of FIG. 6 is designed, configured, intended for implementation into a hard disk drive (HDD) (see, e.g., FIG. 1).

At block 602, form a load beam comprising a substantially planar deck having an opening at each side. For example, load beam 304 (FIGS. 3A-3C), 404 (FIGS. 4A-4D), 504 (FIGS. 5A-5B) is formed including a deck 304d (FIGS. 3A-3C), 404d (FIGS. 4A-4D), 504d (FIGS. 5A-5B) having an opening 304o (FIGS. 3A-3C), 404o (FIGS. 4A-4D), 504o (FIGS. 5A-5B) at each side.

At block 604, form a side rail portion on each side of the deck, wherein each side rail portion comprises a limiter structure, including an arm extension, extending into the opening of the deck. For example, a side rail portion is formed on each side of the deck 304d, 404d, 504d, with each side rail portion including a limiter structure 304l (FIGS. 3A-3C), 404l (FIGS. 4A-4D), 504l (FIGS. 5A-5B), including an arm extension 304l-a (FIGS. 3B-3C), 404l-a (FIG. 4B), 504l-a (FIG. 5B), extending into the opening 304o, 404o, 504o of the deck 304d, 404d, 504d.

At block 606, bend each side rail portion to form a side rail extending in a first direction away from the deck, such that the limiter structure extends away from the corresponding side rail and from the opening in a second direction away from the deck. For example, each side rail portion is bent to form a side rail 304r (FIGS. 3A-3C), 404r (FIGS. 4A-4D), 504r (FIGS. 5A-5B) extending in a first direction away from the deck 304d, 404d, 504d, such that the limiter structure 304l, 404l, 504l extends away from the corresponding side rail side rail 304r, 404r, 504r and from the opening 304o, 404o, 504o in a second direction away from the deck 304d, 404d, 504d. Thus, for ease of manufacturing, each limiter 304l, 404l, 504l is formed into the desired position by the process of bending the side rail portions to form the side rails 304r, 404r, 504r.

At block 608, couple a flexure to a second-direction side of the load beam, including positioning the arm extension on a distal second-direction side of the flexure to limit displacement of the flexure away from the load beam in the second direction. For example, a flexure 302 (FIGS. 3A, 3C), 402 (FIGS. 4A, 4C-4D) is coupled to a second-direction side of the load beam 304, 404, 504, including positioning the arm extension 304l-a, 404l-a, 504l-a on a distal second-direction side of the flexure 302, 402 to limit displacement of the flexure 302, 402 away from the load beam 304, 404, 504 in the second direction.

Thus, in view of the embodiments described herein, each limiter structure enables limiting the displacement between a flexure and the load beam in the z-direction while maintaining the necessary gimballing functionality of the flexure and a corresponding slider relative to the load beam, for operational purposes.

Physical Description of an Illustrative Operating Context

Embodiments may be used in the context of a digital data storage device (DSD) such as a hard disk drive (HDD). Thus, in accordance with an embodiment, a plan view illustrating a conventional HDD 100 is shown in FIG. 1 to aid in describing how a conventional HDD typically operates.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head-stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable", or "flexible printed circuit" (FPC)). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alpha-numeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:
1. A head gimbal assembly (HGA) comprising:
   a suspension assembly comprising:
      a load beam, and
      a flexure;
   wherein the load beam comprises:
      a deck portion comprising an edge on each lateral side, and
      a side rail portion extending away from each edge of the deck portion in a direction away from the flexure, wherein each side rail portion comprises a limiter structure extending from the side rail portion in a direction toward the flexure;

wherein the each limiter structure comprises:
a proximal portion extending directly from the corresponding side rail portion of the load beam, with a majority of the proximal portion extending substantially normal to the deck portion of the load beam; and
a hooking portion extending from the proximal portion substantially parallel to the deck portion of the load beam and positioned on a distal side of the flexure for limiting displacement of the flexure in a direction away from the load beam.

2. The HGA of claim 1, further comprising a limiter gap between the hooking portion of each limiter structure and the flexure, wherein the limiter gap defines an amount of displacement of the flexure mechanically permitted in the direction away from the load beam.

3. The HGA of claim 1, wherein the hooking portion of each limiter structure is positioned relative to the flexure at a location of the flexure outside of a flexure tongue configured to mount a head slider.

4. The HGA of claim 1, wherein the hooking portion of each limiter structure is positioned relative to the flexure at a gimballing portion of the flexure.

5. A hard disk drive comprising the HGA of claim 1.

6. A hard disk drive (HDD) comprising:
a plurality of recording disk media rotatably mounted on a spindle;
a head slider housing a read-write transducer configured to read from and to write to a recording disk medium of the plurality of recording disk media;
means for moving the head slider to access portions of the recording disk medium; and
a head gimbal assembly (HGA) coupled with the means for moving, the HGA comprising:
a flexure, and
a load beam to which the flexure is gimbally coupled, the load beam comprising:
a deck portion comprising an edge on each lateral side, and
a side rail portion extending away from each edge of the deck portion in a direction away from the flexure, wherein each side rail portion comprises a limiter structure extending from the side rail portion in a direction toward the flexure,
wherein each limiter structure comprises:
a proximal portion extending directly from the corresponding side rail portion of the load beam, with a majority of the proximal portion extending substantially normal to the deck portion of the load beam, and
a hooking portion extending from the proximal portion substantially parallel to the deck portion of the load beam and positioned on a distal side of the flexure for limiting displacement of the flexure in a direction away from the load beam.

7. The HDD of claim 6, wherein the HGA further comprises a limiter gap between the hooking portion of each limiter structure and the flexure, the limiter gap defining an amount of displacement of the flexure mechanically permitted in the direction away from the load beam.

8. The HDD of claim 6, wherein the hooking portion of each limiter structure is positioned relative to the flexure at a portion of the flexure outside of a flexure tongue at which the head slider is mounted.

9. A method of manufacturing a head gimbal assembly (HGA), the method comprising:
forming a load beam comprising a substantially planar deck having an opening at each side;
forming a side rail portion on each side of the deck, wherein each side rail portion comprises a limiter structure, including an arm extension, extending into the opening of the deck;
bending each side rail portion to form a side rail extending in a first direction away from the deck, such that:
a proximal portion of the limiter structure extends directly away from the corresponding side rail and from the opening in a second direction away from the deck, with a majority of the proximal portion extending substantially normal to the deck, and
the arm extension extends from the proximal portion substantially parallel to the deck; and
coupling a flexure to a second-direction side of the load beam, including positioning the arm extension on a distal second-direction side of the flexure to limit displacement of the flexure away from the load beam in the second direction.

10. The method of claim 9, wherein coupling the flexure to the load beam includes creating a limiter gap between the arm extension of the limiter structure and the distal side of the flexure, such that the limiter gap defines an amount of available displacement of the flexure from the load beam in the second direction.

* * * * *